(Model.)

M. M. KITZ
BLIND SLAT TENONING MACHINE.

No. 249,950. Patented Nov. 22, 1881.

Witnesses.
W. H. Casey
John V. Hume

Inventor.
Mathias M. Kitz

UNITED STATES PATENT OFFICE.

MATHIAS M. KITZ, OF OSHKOSH, WISCONSIN.

BLIND-SLAT-TENONING MACHINE.

SPECIFICATION forming part of Letters Patent No. 249,950, dated November 22, 1881.

Application filed October 11, 1880. (Model.)

*To all whom it may concern:*

Be it known that I, MATHIAS M. KITZ, a citizen of the United States, residing at the city of Oshkosh, in the county of Winnebago and State of Wisconsin, have invented a new and useful Improvement on a Machine for Cutting Tenons on Blind-Slats; and I do hereby declare that the following is a full, clear, and exact description of the construction and operation of the said machine, reference being had to the drawings which are hereto annexed and made a part of this specification, in which—

Figure 1:
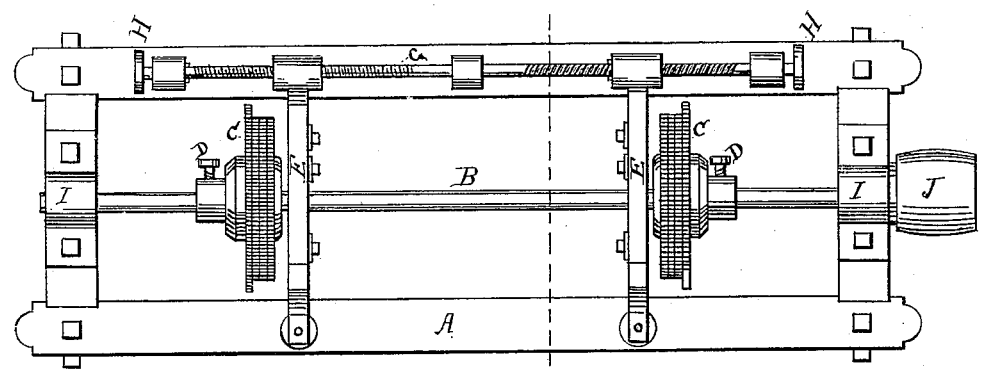
Figure 2:
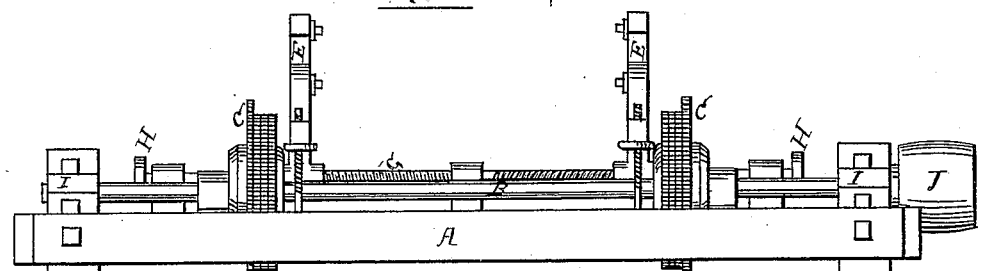
Figure 3:
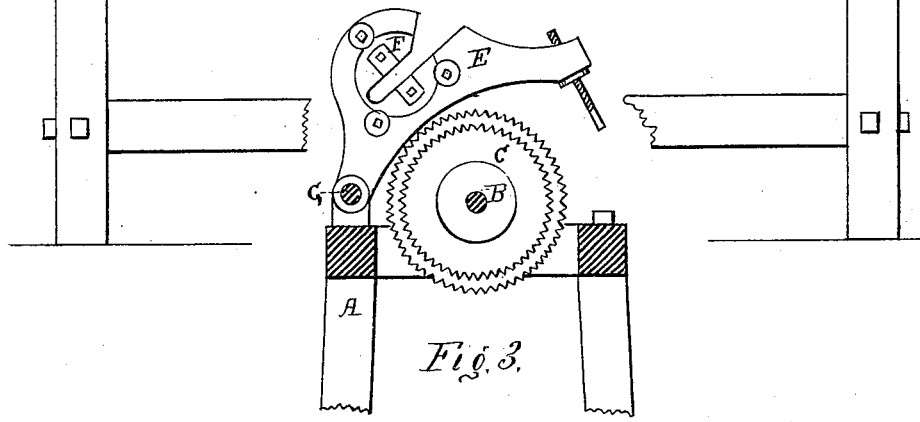

Figure 1 is a plan view; Fig. 2, a longitudinal elevation; Fig. 3, a transverse section.

Similar letters refer to similar parts through the several views.

Letter A represents the frame-work of the machine. Letter B represents arbor, on which the cutting-saws are attached. Letters C C represent the cutting-saws. Letters D D represent set-screws, which hold the collar attached to the saws firmly to the arbor. Letters E E represent a rest or die-socket. Letter F in Fig. 3 represents the die in which the blind-slats are placed when operated. Letter G in Fig. 3 represents joint on which rest or die-socket swings and moves. Letters H H represent an adjustable screw, with a right-and-left thread, by which the rests or die-sockets are moved, and which forms the joint above mentioned. Letters I I represent boxes in which arbor moves or runs. Letter J represents pulley attached to arbor.

The machine consists of a frame of four legs, made of either wood or iron, on the top of which an arbor rests in boxes. On the arbor two sets of movable cutting-saws are placed, and the same are moved in any direction on said arbor by simply loosening a small set-screw inserted in a collar firmly fastened to said sets of saws. Two rests or die-sockets, E E, are placed inside of said sets of saws on an adjustable screw, with a right-and-left thread, H H, with a swing-joint, G, in such a manner that said rests or die-sockets are brought together or separated by turning said adjustable screw to the right or left.

The machine is operated in the following manner: Into the revolving die F, situated in the two rests or die-sockets E E, the blind-slat is inserted and turned to the right once around. The two sets of saws C C revolving to the left make on each end of the slat at the same time the pivot or tenon. The machine is adjusted to different lengths of blind-slats by loosening set-screw in collar D D and moving saws C C, and by turning adjustable screw H H to move the rests or die-sockets.

My improvement does away with the two independent arbors to which are attached the two sets of saws; also, does away with the counter-shaft and pulleys and the two belts running from said counter-shaft to the two independent arbors; also, does away with the thumb-screws by means of which the independent arbors are fastened and held in place when the machine is operated; and said improvement further lessens the number of places to be oiled from seven to two, and the number of belts to be kept in repair from three to one.

What I claim as my invention, and desire to secure by Letters Patent, is—

In a blind-slat-tenoning machine, the combination of the arbor B, saws C C placed on the arbor B so that they are adjustable to and from each other, and the socket-frames E E, swinging vertically on pivotal connections on the frame A and held so that they may be adjusted laterally to and from each other, substantially as set forth.

MATHIAS M. KITZ.

Witnesses:
W. H. CASEY,
JOHN W. HUME.